US012505819B1

(12) United States Patent
Little

(10) Patent No.: US 12,505,819 B1
(45) Date of Patent: Dec. 23, 2025

(54) GUITAR SOUND PLATE

(71) Applicant: Ralph A. Little, Oakboro, NC (US)

(72) Inventor: Ralph A. Little, Oakboro, NC (US)

( * ) Notice: Subject to any disclaimer, the term of this patent is extended or adjusted under 35 U.S.C. 154(b) by 0 days.

(21) Appl. No.: 19/026,816

(22) Filed: Jan. 17, 2025

(51) Int. Cl.
*G10D 3/00* (2020.01)

(52) U.S. Cl.
CPC .................................... *G10D 3/00* (2013.01)

(58) Field of Classification Search
CPC ........................................ G10D 3/00
USPC ........................................ 84/267
See application file for complete search history.

(56) References Cited

U.S. PATENT DOCUMENTS

| | | | | | |
|---|---|---|---|---|---|
| 2,029,135 | A * | 1/1936 | Stanley | G10D 3/04 | 84/267 |
| 3,690,210 | A * | 9/1972 | Imai et al. | G10D 1/08 | 84/294 |
| 4,506,585 | A * | 3/1985 | Desmond | G10D 3/04 | 84/267 |
| 6,982,372 | B2 * | 1/2006 | England | G10D 3/02 | 84/290 |
| 7,098,391 | B2 * | 8/2006 | Wilson | G10D 3/00 | 84/453 |
| 7,566,823 | B1 * | 7/2009 | Niskanen | G10D 3/04 | 84/307 |
| 8,378,191 | B2 * | 2/2013 | Barillaro | G10D 3/02 | 84/267 |
| 8,710,337 | B1 * | 4/2014 | Gomes | G10H 3/185 | 84/294 |
| 9,691,364 | B1 * | 6/2017 | McCabe | G10D 3/153 | |
| 10,210,846 | B1 * | 2/2019 | Bailey, II | G10D 1/08 | |
| 11,232,770 | B1 * | 1/2022 | Katzenberger | G10D 1/08 | |
| 11,250,822 | B2 * | 2/2022 | Kebrle | G10D 3/153 | |
| 11,798,519 | B1 * | 10/2023 | Wright | G10D 3/04 | |
| 2008/0028910 | A1 * | 2/2008 | Shellhammer | G10D 3/02 | 84/291 |
| 2010/0011936 | A1 * | 1/2010 | Dennis | G10D 3/153 | 84/313 |
| 2010/0037746 | A1 * | 2/2010 | Medas | G10D 3/04 | 84/298 |
| 2014/0311317 | A1 * | 10/2014 | Gray | G10D 3/12 | 84/298 |

(Continued)

FOREIGN PATENT DOCUMENTS

| | | | | |
|---|---|---|---|---|
| JP | 2011043780 A * | 3/2011 | | |
| WO | WO-2016035143 A1 * | 3/2016 | | G10H 3/18 |

*Primary Examiner* — Christina M Schreiber

(74) *Attorney, Agent, or Firm* — Cramer Patent & Design, PLLC.; Aaron R. Cramer

(57) ABSTRACT

A guitar sound plate for improving the sound quality of a guitar by enhancing volume and sustain. The guitar sound plate comprises a rigid plate positioned inside the body of the guitar beneath the bridge. The rigid plate includes a plurality of string apertures, each with a countersink on the underside for seating ball ends of guitar strings. The guitar strings pass through the string apertures, the bridge pin holes in the soundboard, over the saddle, and along the neck to tuning posts. Tension from the strings secures the rigid plate against the underside of the soundboard without requiring permanent modifications to the guitar. This configuration efficiently transmits string vibrations into the soundboard, enhancing tonal quality. The guitar sound plate is simple to install and remove, preserving the guitar's original configuration.

2 Claims, 4 Drawing Sheets

(56) References Cited

U.S. PATENT DOCUMENTS

| | | | | |
|---|---|---|---|---|
| 2015/0356955 | A1* | 12/2015 | Brown, Jr. | G10H 1/32<br>84/267 |
| 2017/0025102 | A1* | 1/2017 | Brown, Jr. | G10D 3/12 |
| 2017/0206866 | A1* | 7/2017 | Xavier | G10D 3/04 |
| 2021/0183344 | A1* | 6/2021 | Schanck | G10D 3/06 |
| 2021/0272539 | A1* | 9/2021 | Kebrle | G10D 3/12 |
| 2022/0148540 | A1* | 5/2022 | Gutsman | G10D 13/16 |
| 2023/0260484 | A1* | 8/2023 | Woolery | G10D 1/085<br>84/313 |

* cited by examiner

GUITAR SOUND PLATE

RELATED APPLICATIONS

None

FIELD OF THE INVENTION

This invention relates to devices for stringed musical instruments and, more specifically, to a guitar sound plate designed to enhance the acoustic properties of a guitar by improving volume and sustain without requiring permanent modifications to the instrument.

BACKGROUND OF THE INVENTION

Traditional acoustic guitars rely on bridge pins to secure the strings to the instrument. While effective, this design can result in limited sound projection and sustain due to insufficient transmission of string vibrations into the soundboard. Additionally, the use of bridge pins can complicate string replacement and potentially damage the guitar over time. Prior solutions aimed at improving guitar acoustics often involve permanent modifications, such as drilling or gluing, which can affect the guitar's structural integrity and resale value. There exists a need for a device that enhances the sound quality of a guitar while preserving its original configuration, allowing for non-invasive installation and removal. The present invention addresses these issues by providing a guitar sound plate that replaces bridge pins and optimizes the transfer of string vibrations into the soundboard, resulting in improved tonal quality and ease of use.

SUMMARY OF THE INVENTION

Embodiments of the present disclosure may include a guitar sound plate configured to improve sound quality in a guitar, the guitar sound plate including a rigid plate. Embodiments may also include a plurality of string apertures formed through the rigid plate, each string aperture having a countersink on an underside of the rigid plate. In some embodiments, the rigid plate may be configured to be positioned inside a body of the guitar beneath a bridge and aligned with a plurality of bridge pin holes in a soundboard of the guitar.

In some embodiments, the countersink of each string aperture may be configured to seat a ball end of a guitar string. In some embodiments, the guitar strings may be configured to pass through the plurality of string apertures, through the plurality of bridge pin holes, over a saddle of the bridge, and along a neck of the guitar to a plurality of tuning posts. In some embodiments, the tension of the guitar strings secures the rigid plate against the underside of the soundboard. In some embodiments, the rigid plate enhances sound quality by increasing the volume and sustain of the guitar.

In some embodiments, the rigid plate may be made of brass. In some embodiments, the rigid plate may be rectangular. In some embodiments, the plurality of string apertures may be equally spaced along a longitudinal centerline of the rigid plate. In some embodiments, the rigid plate may be three inches long, one inch wide, and one-quarter inch thick, with tolerances of ±one-quarter inch, ±one-eighth inch, and ±one-thirty-second inch, respectively. In some embodiments, the rigid plate may be configured to replace bridge pins without requiring permanent modifications to the guitar.

Embodiments of the present disclosure may also include a method for installing a guitar sound plate within a guitar, the method including removing a plurality of bridge pins and a plurality of guitar strings from the guitar. Embodiments may also include positioning a rigid plate inside a body of the guitar beneath a bridge and aligning a plurality of string apertures of the rigid plate with a plurality of bridge pin holes in a soundboard of the guitar.

Embodiments may also include inserting a bare end of each guitar string through a countersink of a string aperture on the rigid plate and through a corresponding bridge pin hole. Embodiments may also include extending each guitar string over a saddle of the bridge and along a neck of the guitar to a tuning post. Embodiments may also include coupling each guitar string to the tuning post and applying tension to secure the rigid plate against the underside of the soundboard. Embodiments may also include tuning the guitar strings to a desired pitch.

In some embodiments, the method may include removing the rigid plate to restore the guitar to its original configuration without leaving any marks, holes, or blemishes. In some embodiments, the rigid plate may be configured to seat ball ends of the guitar strings within countersinks of the string apertures to prevent shifting of the strings during use. In some embodiments, the rigid plate conveys vibrations of the guitar strings into the soundboard to enhance the volume and sustain of notes played on the guitar.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
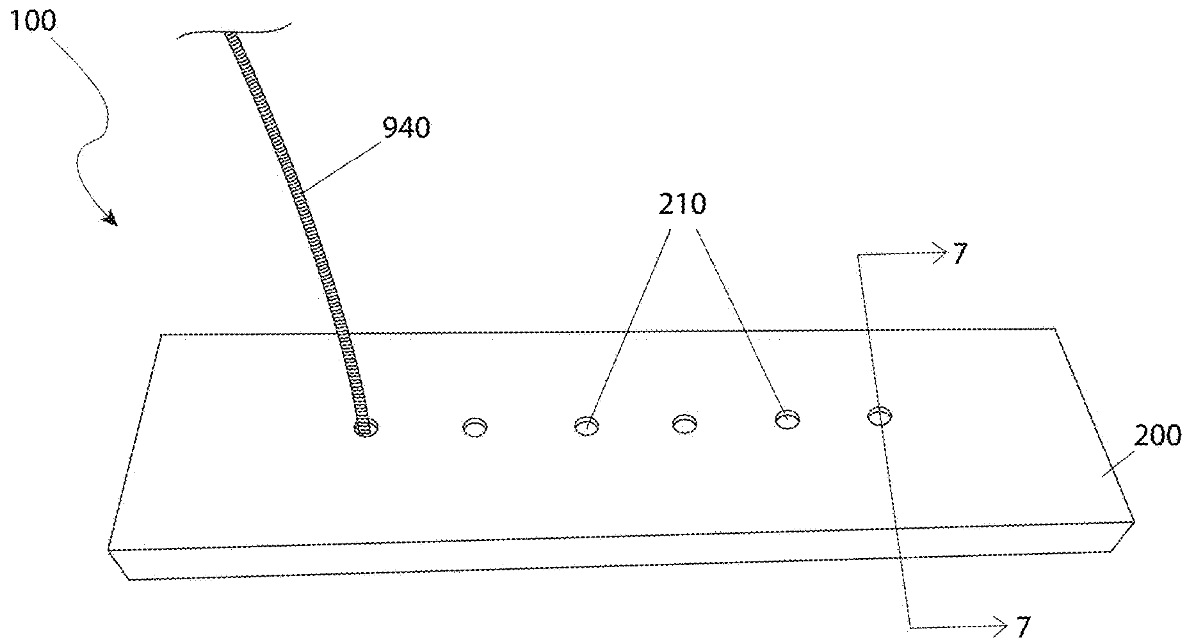
FIG. 1 is a top isometric view of a guitar sound plate 100, according to an embodiment of the present invention.
Figure 2:
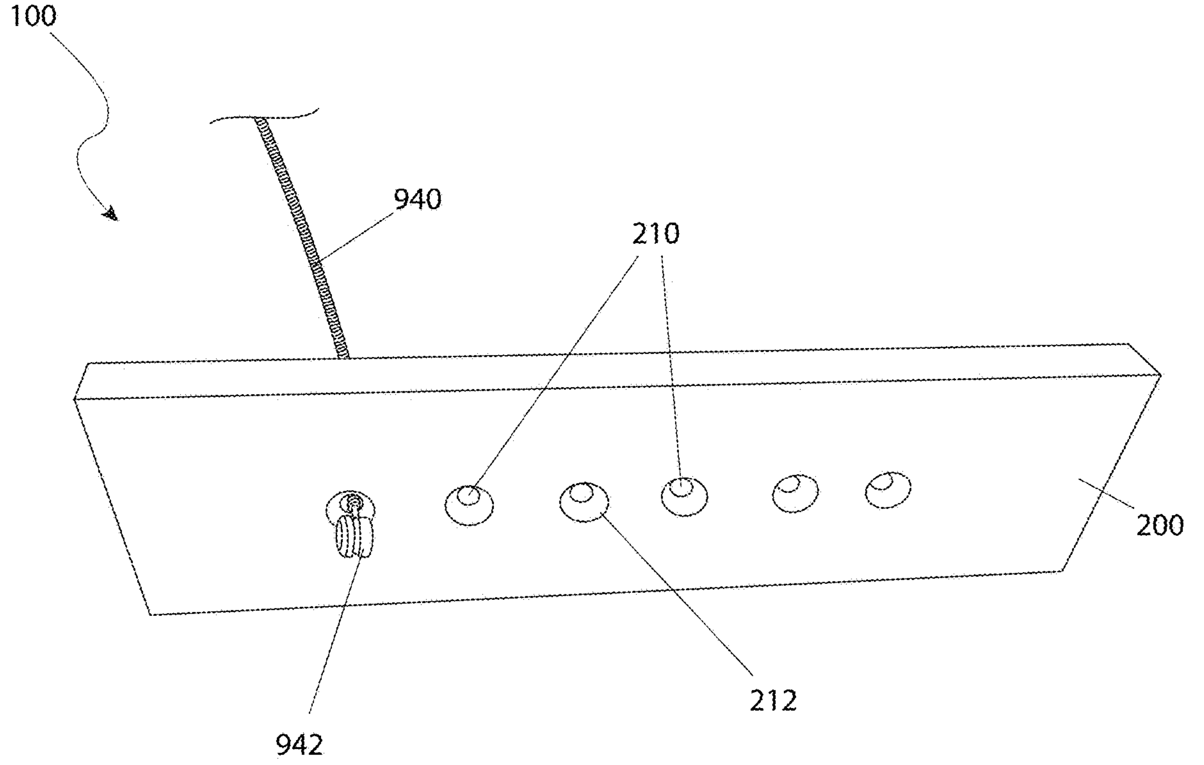
FIG. 2 is a bottom isometric view of a guitar sound plate 100, according to an embodiment of the present invention.
Figure 3:
FIG. 3 is a front view of a guitar sound plate 100, according to an embodiment of the present invention.
Figure 4:
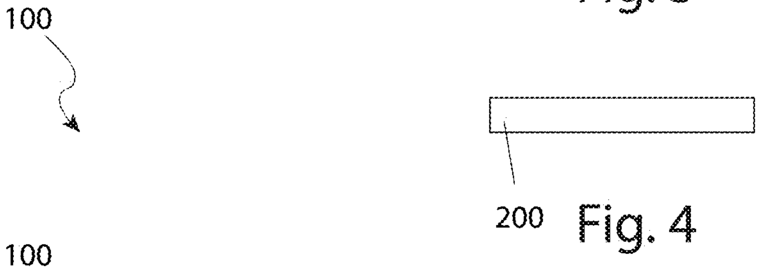
FIG. 4 is a side view of a guitar sound plate 100, according to an embodiment of the present invention.
Figure 5:
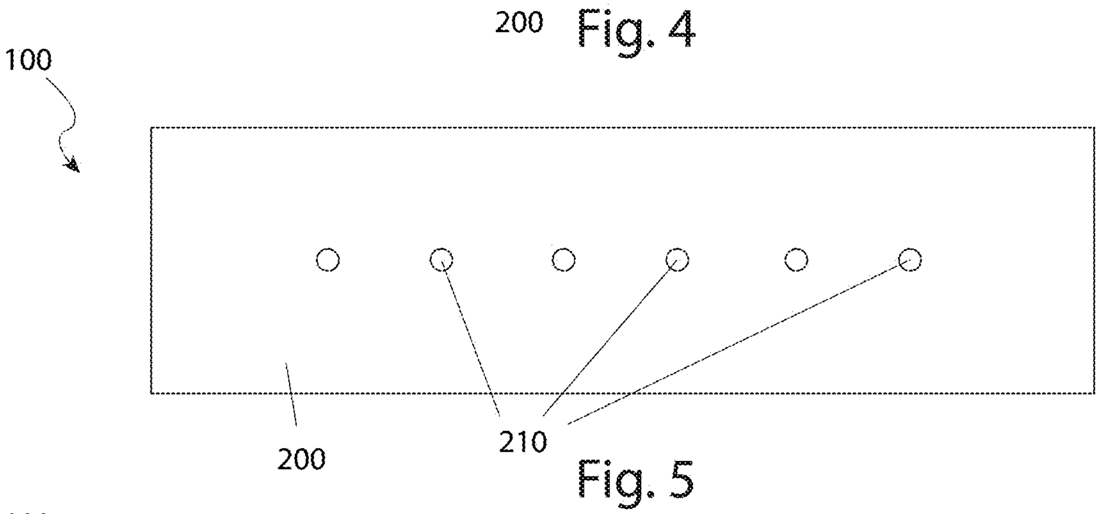
FIG. 5 is a top view of a guitar sound plate 100, according to an embodiment of the present invention.
Figure 6:
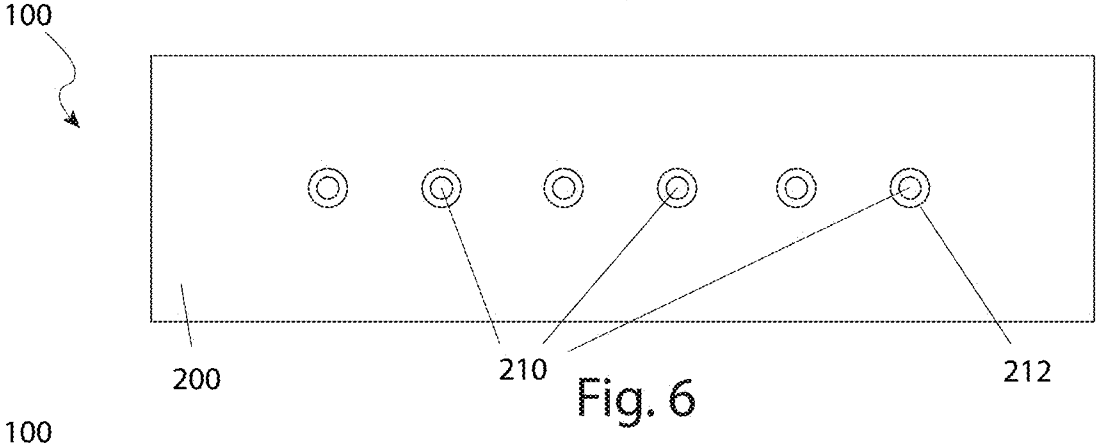
FIG. 6 is a bottom view of a guitar sound plate 100, according to an embodiment of the present invention.
Figure 7:
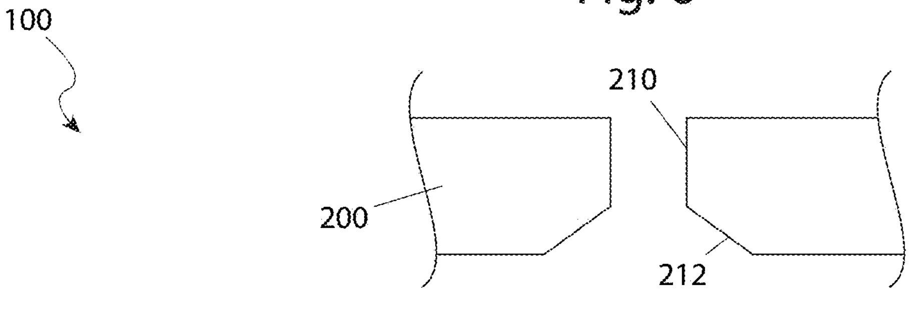
FIG. 7 is a cross-sectional view of a guitar sound plate 100 across the sectional line 7-7 as shown in FIG. 1, according to an embodiment of the present invention.
Figure 8:
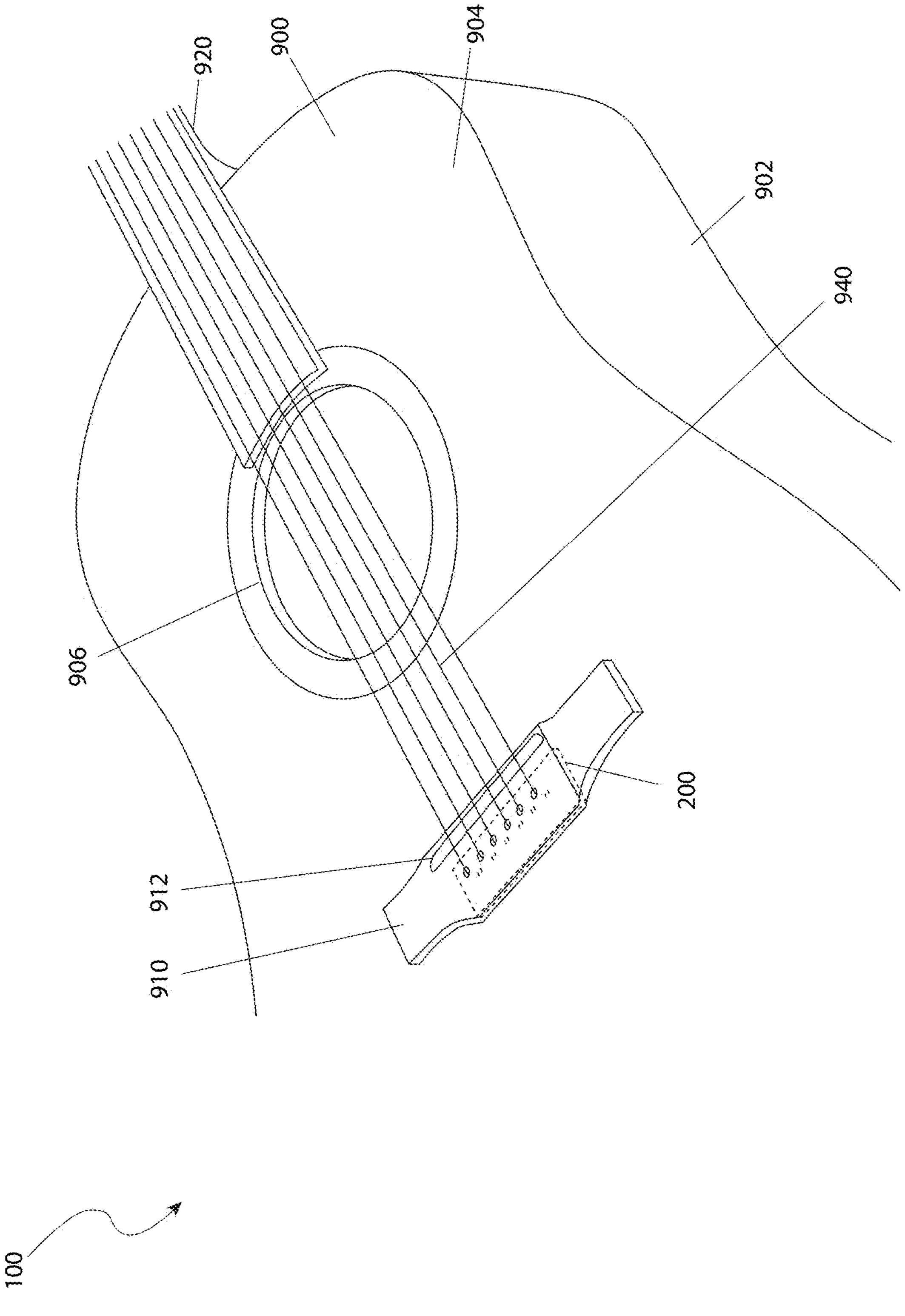
FIG. 8 is an in-use view of a guitar sound plate 100, according to an embodiment of the present invention; and, FIG. 9 is a detail view of a guitar sound plate 100, according to an embodiment of the present invention.
Figure 9:
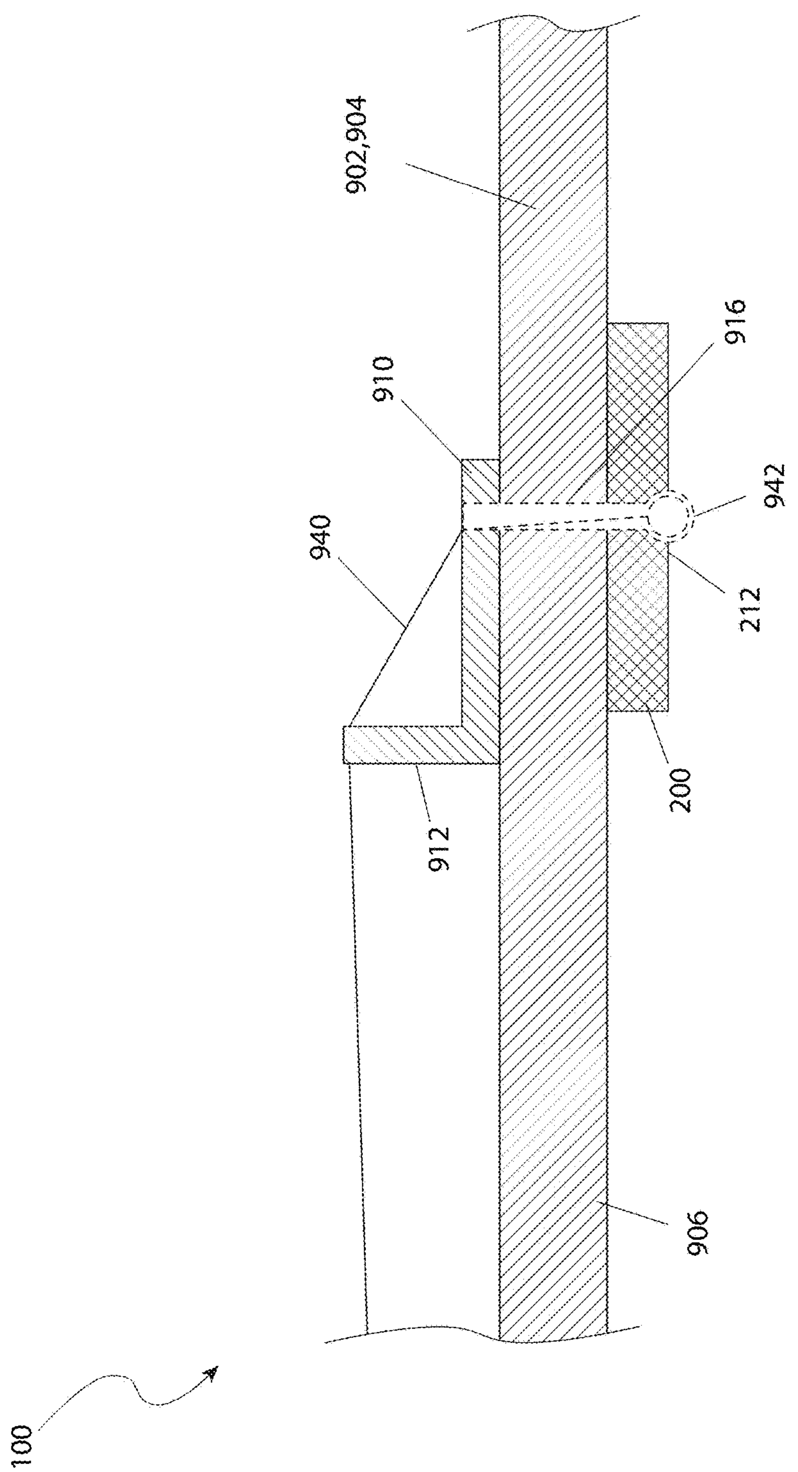

100 guitar sound plate
200 rigid plate
210 string aperture
212 countersink
900 guitar
902 body
904 soundboard
906 sound hole
910 bridge
912 saddle
916 bridge pin hole
920 neck

940 guitar string
942 ball end

DESCRIPTION OF THE INVENTION

The present invention is directed to a guitar sound plate (herein described as the "invention") 100. The invention 100 may comprise a rigid plate 200 with a plurality of string apertures 210. The invention 100 may be configured to replace a plurality of bridge pins to couple a plurality of guitar strings 940 to a body 902 of a guitar 900. The rigid plate 200 may be positioned inside of the body 902 and the plurality of guitar strings 940 may pass through the plurality of string apertures 210 on the rigid plate 200 and then through a plurality of bridge pin holes 916 before passing over a saddle 912 of the bridge 910. The invention 100 may improve the sound of the guitar 900 by increasing volume and sustain. The invention 100 may be installed without requiring any alterations to be made to the guitar 900 (i.e. no screws, nails, brads, drilling, or gluing).

The invention 100 may be removed to restore the original guitar configuration using the plurality of bridge pins without leaving holes, marks, or other blemishes on the guitar 900.

The plurality of string apertures 210 may pass vertically through the rigid plate 200 along the longitudinal centerline of the rigid plate 200. The plurality of string apertures 210 may be equally spaced along a straight line. The spacing of the plurality of string apertures 210 may match the spacing of the plurality of bridge pin holes 916 in the body 902 of the guitar 900.

The rigid plate 200 may be positioned on the underside of the soundboard 904 of the body 902 at a position beneath the bridge 910. The rigid plate 200 may be oriented with sound holes 906 lined up laterally such that the plurality of string apertures 210 align with the plurality of bridge pin holes 916. The plurality of guitar strings may be configured to pass upwards through the rigid plate 200 via the plurality of string apertures 210 and then through the plurality of bridge pin holes 916 to exit the body 902 of the guitar 900. The plurality of guitar strings 940 may be pulled over the saddle 912 of the bridge 910 and along the neck 920 of the guitar 900 to a plurality of tuning posts and may be wound around the plurality of tuning posts. The rigid plate 200 may be held in place within the body 902 of the guitar 900 by tension from the plurality of guitar strings 940.

In a preferred embodiment, the rigid plate 200 may be rectangular.

In a preferred embodiment, the rigid plate 200 may be made of brass.

In a preferred embodiment, there may be six (6) string apertures in the rigid plate 200.

An individual string aperture 210 may comprise a countersink 212 on the underside of the rigid plate 200 such that the ball end 942 of an individual guitar string 940 seats within the countersink 212. The countersink 212 may prevent the individual guitar string 940 from degrading the sound quality by shifting during use.

In a preferred embodiment, the rigid plate 200 may be three inches with an error of one-quarter of an inch (3+/−¼ ins.) long, one inch with an error of one-eighth of an inch (1+/−⅛ in.) wide, and one-quarter of an inch with an error of one-thirtysecondths of an inch (¼+/−1⁄32 in.) thick.

The invention 100 may be installed by completing these steps: —Remove the plurality of bridge pins from the bridge 910. —Remove the plurality of guitar strings 940 from the guitar 900. —Position the rigid plate 200 inside of the body 902 and pass the bare string end of the individual guitar string 940 up through the rigid plate 200 by inserting the bare string end of the individual guitar string 940 into the individual string aperture at the countersink 212. —Pass the bare string end of the individual guitar string 940 up through an individual bridge pin hole 916 from within the body 902 of the guitar 900. —Pull the individual guitar string 940 over the saddle 912 and up to an individual tuning post. —Coupling the individual guitar string 940 to the individual tuning post and tightening the individual tuning post. This will pull the rigid plate 200 up against the underside of the soundboard 904. —Repeat these steps until all of the plurality of guitar strings have been installed then tune the plurality of guitar strings individually.

When installing the plurality of guitar strings 940, at least two (2) different approaches are possible: 1) With the rigid plate 200 held outside of the body 902, all of the plurality of guitar strings 940 may be routed through the plurality of string apertures 210 on the rigid plate 200, into the sound hole 906, and through the plurality of bridge pin holes 916 on the soundboard 904 from the inside of the body 902. The rigid plate 200 may then be placed into the body 902 through the sound hole 906 and pulled up against the bottom of the soundboard 904 using the plurality of guitar strings 940. 2) The rigid plate 200 may be held in place inside of the body 902 against the bottom of the soundboard 904 and the individual guitar strings 940 may be routed up through the plurality of string apertures 210 in the rigid plate 200 and up through the plurality of bridge pin holes 916 to emerge on the top side of the soundboard 904. This approach may be used to replace the plurality of guitar strings 940 one (1) at a time as the plurality of guitar strings 940 break.

In an alternative embodiment, the device consists solely of the rigid plate 200 with the plurality of string apertures 210, each string aperture 210 featuring a countersink 212. This embodiment excludes additional elements such as screws, adhesives, or any auxiliary fasteners, relying exclusively on the tension of the plurality of guitar strings 940 to maintain the rigid plate 200 securely against the underside of the soundboard 904 of the guitar 900. The rigid plate 200 is positioned beneath the bridge 910 and aligned such that the plurality of string apertures 210 correspond with the plurality of bridge pin holes 916, allowing the ball ends 942 of the guitar strings 940 to seat firmly within the countersinks 212. The guitar strings 940 pass through the rigid plate 200, emerge through the sound hole 906, travel over the saddle 912 of the bridge 910, and extend along the neck 920 of the guitar 900. This configuration ensures stability during use, prevents shifting, and improves the sound quality of the guitar 900 by increasing volume and sustain. The invention 100 preserves the integrity of the guitar 900 without requiring any permanent modifications, ensuring it can be returned to its original configuration effortlessly.

In use, the plurality of bridge pins and the plurality of guitar strings 940 may be removed from a guitar 900. The plurality of guitar strings 940 may be re-installed by passing each of the plurality of guitar strings 940 up through the plurality of string apertures 210 of the rigid plate 200 via the countersink 212 side of the plurality of string apertures 210 and through the plurality of bridge pin holes 916 from bottom to top. As the plurality of guitar strings 940 emerge from the top of the soundboard 904, they may be pulled over the saddle 912 and up to the plurality of tuning posts where the plurality of guitar strings 940 may be coupled to the plurality of tuning posts. The plurality of guitar strings 940 may then be tuned using the plurality of tuning posts. The rigid plate 200 may press against the bottom of the soundboard 904, held there by tension from the plurality of guitar strings 940. The rigid plate 200 may convey vibrations of the plurality of guitar strings 940 into the soundboard 904 resulting in better sound from the guitar 900. As non-limiting examples, the invention 100 may increase the volume and sustain of notes played on the guitar 900.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A guitar sound plate assembly configured to improve sound quality in a guitar, the guitar sound plate assembly consisting of:

a rigid plate having a plurality of string apertures formed therethrough, each string aperture having a countersink located on an underside of the rigid plate;

wherein the rigid plate is sized and configured to be positioned inside a body of the guitar beneath a bridge and aligned with a plurality of bridge pin holes in a soundboard of the guitar;

wherein the countersink of each string aperture is configured to seat a ball end of a guitar string so as to prevent shifting of the guitar string during use;

wherein during use the guitar strings pass through the plurality of string apertures, through the plurality of bridge pin holes, over a saddle of the bridge, and along a neck of the guitar to tuning posts; and, wherein tension of the guitar strings presses the rigid plate against an underside of the soundboard to convey vibrations of the guitar strings into the soundboard to increase volume and sustain, the guitar sound plate assembly excluding screws, adhesives, auxiliary fasteners, and bridge pins and being installable and removable without permanent modification and without leaving marks, holes, or blemishes on the guitar.

2. The guitar sound plate assembly of claim 1, wherein the plurality of string apertures consists of six string apertures equally spaced along a longitudinal centerline of the rigid plate with spacing corresponding to spacing of the plurality of bridge pin holes of the soundboard; and, wherein each ball end is seated within the countersink of a corresponding string aperture to maintain the rigid plate in position under string tension while the guitar is tuned to a desired pitch.

* * * * *